US012394560B2

(12) United States Patent
Tominaga et al.

(10) Patent No.: US 12,394,560 B2
(45) Date of Patent: Aug. 19, 2025

(54) COIL COMPONENT AND METHOD OF MANUFACTURING THE SAME

(71) Applicant: Murata Manufacturing Co., Ltd., Kyoto-fu (JP)

(72) Inventors: Ryuichiro Tominaga, Nagaokakyo (JP); Keisuke Kunimori, Nagaokakyo (JP); Yuuki Kawakami, Nagaokakyo (JP); Yoshimasa Yoshioka, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 711 days.

(21) Appl. No.: 17/695,774

(22) Filed: Mar. 15, 2022

(65) Prior Publication Data

US 2022/0310311 A1 Sep. 29, 2022

(30) Foreign Application Priority Data

Mar. 27, 2021 (JP) ................................ 2021-054434

(51) Int. Cl.

*H01F 27/29* (2006.01)
*H01F 17/00* (2006.01)
*H01F 17/04* (2006.01)
*H01F 41/04* (2006.01)

(52) U.S. Cl.

CPC ....... *H01F 27/292* (2013.01); *H01F 17/0013* (2013.01); *H01F 17/04* (2013.01); *H01F 41/041* (2013.01); *H01F 2017/0066* (2013.01); *H01F 2017/048* (2013.01)

(58) Field of Classification Search

CPC .... H01F 27/292; H01F 17/0013; H01F 17/04; H01F 41/041; H01F 2017/0066; H01F 2017/048

See application file for complete search history.

(56) References Cited

U.S. PATENT DOCUMENTS

| | | | | |
|---|---|---|---|---|
| 2017/0032882 | A1* | 2/2017 | Yang | H01F 27/2804 |
| 2019/0244743 | A1* | 8/2019 | Hirai | H01F 41/12 |
| 2020/0098506 | A1* | 3/2020 | Hamada | H01F 27/32 |

FOREIGN PATENT DOCUMENTS

| | | | | |
|---|---|---|---|---|
| CN | 103474367 A | * 12/2013 | | H01L 24/11 |
| JP | 2014-032978 A | 2/2014 | | |
| JP | 2017199718 A | * 11/2017 | | |
| KR | 19990066108 A | * 8/1999 | | |

* cited by examiner

*Primary Examiner* — Malcolm Barnes

(74) *Attorney, Agent, or Firm* — Studebaker Brackett PLLC

(57) ABSTRACT

A coil component includes a main body made of a magnetic material, a linear inductor wiring conductor arranged in the main body, an electrically insulating pedestal having a top surface extending along the inductor wiring conductor in the main body and a pair of side surfaces each extending from both outer edges of the top surface in a direction intersecting the top surface, and a conductive seed layer provided over an entire region of at least a region sandwiched between the top surface of the pedestal and the inductor wiring conductor. When a width dimension of a surface of the inductor wiring conductor in contact with the seed layer is defined as a first width dimension and a width dimension of the seed layer is defined as a second width dimension, the second width dimension is larger than the first width dimension.

19 Claims, 17 Drawing Sheets

COIL COMPONENT AND METHOD OF MANUFACTURING THE SAME

CROSS-REFERENCE TO RELATED APPLICATION

This application claims benefit of priority to Japanese Patent Application No. 2021-054434 filed Mar. 27, 2021, the entire content of which is incorporated herein by reference.

BACKGROUND

Technical Field

The present disclosure relates to a coil component and a method of manufacturing the same, and more particularly to a coil component in which a linear inductor wiring conductor is built in a main body made of a magnetic material and a method of manufacturing the same.

Background Art

Japanese Unexamined Patent Application Publication No. 2014-32978 describes a coil component including an insulating substrate, a build-up portion provided on the insulating substrate, a seed layer formed on the build-up portion by electroless copper plating or the like, an inductor wiring conductor formed on the seed layer by electrolytic copper plating or the like, and an insulating resin film coating that coats the inductor wiring conductor.

SUMMARY

In the above-described coil component, since the seed layer is for supplying electric charge when the inductor wiring conductor is formed by electrolytic plating, the seed layer is not particularly required after the inductor wiring conductor is formed. Also, since the seed layer is made of an electrically conductive material, this may lead to an undesired electrical short circuit. Therefore, after the inductor wiring conductor is formed, an unnecessary portion of the seed layer, that is, a portion of the seed layer exposed from the inductor wiring conductor is removed.

Wet etching is typically applied to remove the unnecessary portion of the seed layer. However, the wet etching affects not only the seed layer but also the inductor wiring conductor. As such, the inductor wiring conductor is thinned, as a result, which causes such problems that the resistance value of the inductor wiring conductor is increased, and a close contact force between the inductor wiring conductor and a member forming a base thereof is decreased. This problem becomes more prominent particularly when the inductor wiring conductor and the seed layer are made of materials having the same main component, such as when the inductor wiring conductor is made of copper and the seed layer is made of copper.

In view of the above, the present disclosure provides a structure of a coil component by which problems resulted from thinning of the inductor wiring conductor can be less likely to occur even when an unnecessary portion of the seed layer is removed, such as an increase in resistance value of the inductor wiring conductor and a decrease in the close contact force between the inductor wiring conductor and a member forming a base of the inductor wiring conductor.

In addition, the present disclosure provides a method of manufacturing a coil component in which it is not necessary to apply a wet etching step for removing an unnecessary portion of a seed layer.

A coil component according to one aspect of the present disclosure includes a main body made of a magnetic material, a linear inductor wiring conductor arranged in the main body, an electrically insulating pedestal having a top surface extending along the inductor wiring conductor in the main body and a pair of side surfaces each extending from both outer edges of the top surface in a direction intersecting the top surface, and a conductive seed layer provided over an entire region of at least a region sandwiched between the top surface of the pedestal and the inductor wiring conductor.

In addition, in the above-described coil component, when a width dimension in a width direction of a surface of the inductor wiring conductor in contact with the seed layer is defined as a first width dimension and a width dimension in the width direction of the seed layer is defined as a second width dimension, the second width dimension is larger than the first width dimension.

A method of manufacturing a coil component according to another aspect of the present disclosure includes preparing a support substrate having a first main surface and a second main surface opposed to each other, and providing an electrically insulating pedestal on the first main surface of the support substrate, with the pedestal having a top surface extending along a linear inductor wiring conductor to be formed and a pair of side surfaces each extending from both outer edges of the top surface in a direction intersecting the top surface. The method of manufacturing a coil component also includes forming a conductive seed layer so as to cover the pedestal and cover the first main surface of the support substrate exposed from the pedestal, providing a first resist on the seed layer, with the first resist having an opening that exposes the seed layer on a central portion in a width direction of the top surface of the pedestal, forming an inductor wiring conductor on the seed layer through the opening of the first resist by electrolytic plating, removing the first resist, and forming a first magnetic layer on the first main surface side of the support substrate so as to position the inductor wiring conductor inside. The method of manufacturing a coil component further includes removing the support substrate and a portion of the seed layer other than a portion covering the pedestal from the second main surface side of the support substrate, and forming a second magnetic layer so as to be in contact with the pedestal and the first magnetic layer.

According to the above-described coil component, the seed layer serving as the base of the inductor wiring conductor is provided on the pedestal, and the width dimension of the seed layer is made larger than the width dimension of the surface of the inductor wiring conductor in contact with the seed layer. Therefore, the inductor wiring conductor can be kept away from an unnecessary portion of the seed layer to be removed. Therefore, even when wet etching is applied for removing the unnecessary portion of the seed layer, for example, the inductor wiring conductor can be less likely to be affected by the wet etching. Therefore, thinning of the inductor wiring conductor results in problems such as an increase in resistance value of the inductor wiring conductor and a decrease in the close contact force between the inductor wiring conductor and a member forming a base thereof, but it is possible to make the problems less likely to occur.

In addition, according to the coil component described above, since the seed layer is provided on the pedestal, it is possible to remove an unnecessary portion of the seed layer without performing a wet etching step by applying a predetermined manufacturing method.

According to the method of manufacturing the coil component described above, since a step of scraping from the second main surface side of the support substrate is employed in order to remove an unnecessary portion of the seed layer, that is, a portion of the seed layer other than a portion covering the pedestal, it is not necessary to perform a wet etching step. Therefore, it is possible to avoid the problems that the inductor wiring conductor is thinned, as a result, the resistance value of the inductor wiring conductor is increased and the close contact force between the inductor wiring conductor and a member forming the base thereof is decreased.

BRIEF DESCRIPTION OF THE DRAWINGS

FIG. 2A illustrates a cross-section taken along a line A-A of FIG. 1, and FIG. 2B illustrates a cross-section taken along a line B-B of FIG. 1;

FIG. 9A illustrates a state in which a second resist is provided on the seed layer in a portion corresponding to the portion illustrated in FIG. 2A, and FIG. 9B illustrates a state in which the second resist having an opening of a pattern corresponding to a pattern of an extended conductor electrically connected to an end portion of the inductor wiring conductor is provided on the seed layer in a portion corresponding to the portion illustrated in FIG. 2B;

FIG. 10A illustrates a state in which the state illustrated in FIG. 9A is maintained in a portion corresponding to the portion illustrated in FIG. 2A, and FIG. 10B illustrates a state in which the extended conductor is formed on the end portion of the inductor wiring conductor through the opening of the second resist by electrolytic plating in a portion corresponding to the portion illustrated in FIG. 2B;

FIG. 11A illustrates a state in which the second resist is removed in a portion corresponding to the portion illustrated in FIG. 2A, and FIG. 11B illustrates a state in which the second resist is removed in a portion corresponding to the portion illustrated in FIG. 2B;

FIG. 12A illustrates a state in which a first magnetic layer is provided on the first main surface side of the support substrate so as to position the inductor wiring conductor inside in a portion corresponding to the portion illustrated in FIG. 2A, and FIG. 12B illustrates a state in which the first magnetic layer is provided so as to incorporate not only the inductor wiring conductor but also the extended conductor in a portion corresponding to the portion illustrated in FIG. 2B;

FIG. 13A illustrates a state in which the first magnetic layer is scraped in a portion corresponding to the portion illustrated in FIG. 2A, and FIG. 13B illustrates a state in which the first magnetic layer is scraped to expose an end surface of the extended conductor in a portion corresponding to the portion illustrated in FIG. 2B;

FIG. 14A illustrates a state in which a solder resist is provided on the first magnetic layer in a portion corresponding to the portion illustrated in FIG. 2A, and FIG. 14B illustrates a state in which the solder resist is provided on the first magnetic layer in a portion corresponding to the portion illustrated in FIG. 2B;

FIG. 15A illustrates a state in which the support substrate is removed in a portion corresponding to the portion illustrated in FIG. 2A and further, a portion of the seed layer other than a portion covering the pedestal is removed from the second main surface side of the support substrate, and FIG. 15B illustrates a state in which the support substrate is removed in a portion corresponding to the portion illustrated in FIG. 2B and further, a portion of the seed layer other than a portion covering the pedestal is removed from the second main surface side of the support substrate;

FIG. 16A illustrates a state in which a second magnetic layer is provided in contact with the pedestal and the first magnetic layer in a portion corresponding to the portion illustrated in FIG. 2A, and FIG. 16B illustrates a state in which the second magnetic layer is provided in contact with the pedestal and the first magnetic layer in a portion corresponding to the portion illustrated in FIG. 2B;

FIG. 18A illustrates a cross-section corresponding to a cross-section taken along a line A-A of FIG. 1, and FIG. 18B illustrates a cross-section corresponding to a cross-section taken along a line B-B of FIG. 1;

FIG. 19A illustrates a state in which a resist is provided serving as a preparation stage of a step of removing an unnecessary portion of the seed layer in a portion corresponding to the portion illustrated in FIG. 18A, and FIG. 19B illustrates a state in which a resist is provided serving as a preparation stage of a step of removing an unnecessary portion of the seed layer in a portion corresponding to the portion illustrated in FIG. 18B;

FIG. 20A illustrates a state in which an unnecessary portion of the seed layer is removed and then a resist is removed in a portion corresponding to the portion illustrated in FIG. 18A, and FIG. 20B illustrates a state in which an unnecessary portion of the seed layer is removed and then a resist is removed in a portion corresponding to the portion illustrated in FIG. 18B;

DETAILED DESCRIPTION

First Embodiment

Figure 1:
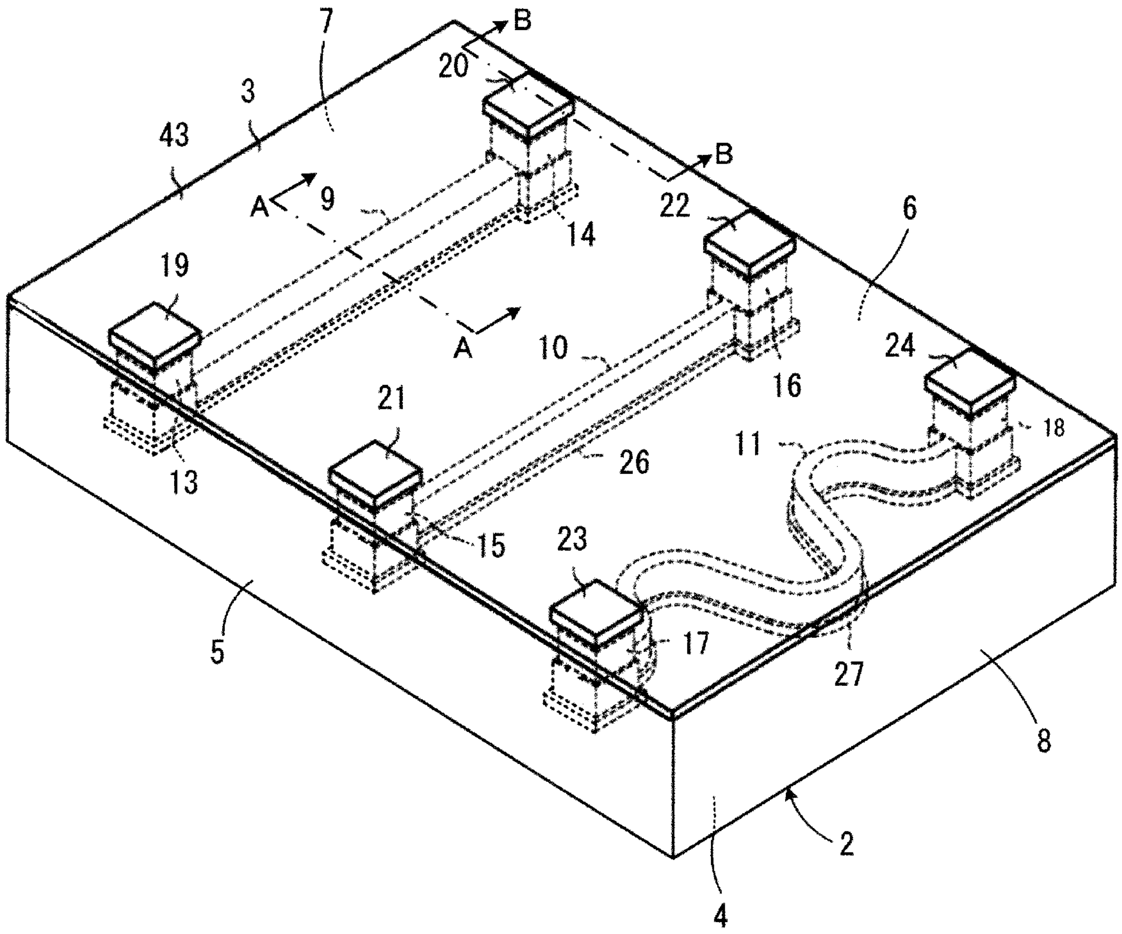
FIG. 1 is a perspective view illustrating an appearance of a coil component.

A structure of a coil component 1 according to a first embodiment of the present disclosure will be described with reference to FIG. 1 and FIGS. 2A and 2B.

The coil component 1 includes a main body 2 made of a magnetic material. The magnetic material forming the main body 2 is made of, for example, an organic material containing a metal magnetic powder. The metal magnetic powder has, for example, an average particle diameter of equal to or less than 5 μm, and is made of an alloy containing Fe such as an Fe—Si based alloy. Note that the metal magnetic powder may be crystalline or amorphous. Note that an oxide magnetic powder such as ferrite may be used instead of the metal magnetic powder. As the organic material, for example, an epoxy resin, a mixture of an epoxy resin and an acrylic resin, or a mixture of an epoxy resin, an acrylic resin, and another resin is used.

The main body 2 has a plate shape or a rectangular parallelepiped shape, and has an upper surface 3, a lower surface 4, and four end surfaces 5, 6, 7, and 8 connecting the upper surface 3 and the lower surface 4. The "upper surface" and the "lower surface" are based on the upper and lower sides in FIG. 1, and do not imply the upper and lower sides of the coil component 1 in an actual use state, but may be the main surface (the widest surface) of the main body 2. Note that a solder resist 43 described later is provided on the upper surface 3 of the main body 2. Three linear inductor wiring conductors 9, 10, and 11 are arranged in the main body 2. The inductor wiring conductors 9, 10, and 11 extend in a direction connecting the opposing end surfaces 5 and 6. The inductor wiring conductors 9 and 10 have a straight shape, and the inductor wiring conductor 11 has a meander shape. In addition, the inductor wiring conductor 9 is thicker than the inductor wiring conductors 10 and 11.

Extended conductors 13 and 14 are provided at one end portion and the other end portion of the inductor wiring conductor 9, respectively. Extended conductors 15 and 16 are provided at one end portion and the other end portion of the inductor wiring conductor 10, respectively. Extended conductors 17 and 18 are provided at one end portion and the other end portion of the inductor wiring conductor 11, respectively. As can be seen from the state of the extended conductor 14 illustrated in FIG. 2B, each of the extended conductors 13 to 18 is positioned so as to overlap a corresponding end portion of each of the inductor wiring conductors 9 to 11. In addition, each of the inductor wiring conductors 9 to 11 is wider than the other portion at each end portion connected to each of the extended conductors 13 to 18.

The inductor wiring conductors 9 to 11 and the extended conductors 13 to 18 are made of, for example, Au, Pt, Pd, Ag, Cu, Al, Co, Cr, Zn, Ni, Ti, W, Fe, Sn, or In, or a compound containing these.

Six external terminal electrodes 19 to 24 are provided so as to be exposed on the outer surface of the main body 2, more specifically, the upper surface 3. One end portion of the inductor wiring conductor 9 is electrically connected to the external terminal electrode 19 via the extended conductor 13, and the other end portion is electrically connected to the external terminal electrode 20 via the extended conductor 14. One end portion of the inductor wiring conductor 10 is electrically connected to the external terminal electrode 21 via the extended conductor 15, and the other end portion is electrically connected to the external terminal electrode 22 via the extended conductor 16. One end portion of the inductor wiring conductor 11 is electrically connected to the external terminal electrode 23 via the extended conductor 17, and the other end portion is electrically connected to the external terminal electrode 24 via the extended conductor 18.

Electrically insulating pedestals 25, 26 and 27 are also provided in the main body 2. The pedestals 25 to 27 are made of, for example, epoxy resin, acrylic resin, phenol resin, polyimide, or a mixture thereof.

Figure 2A:
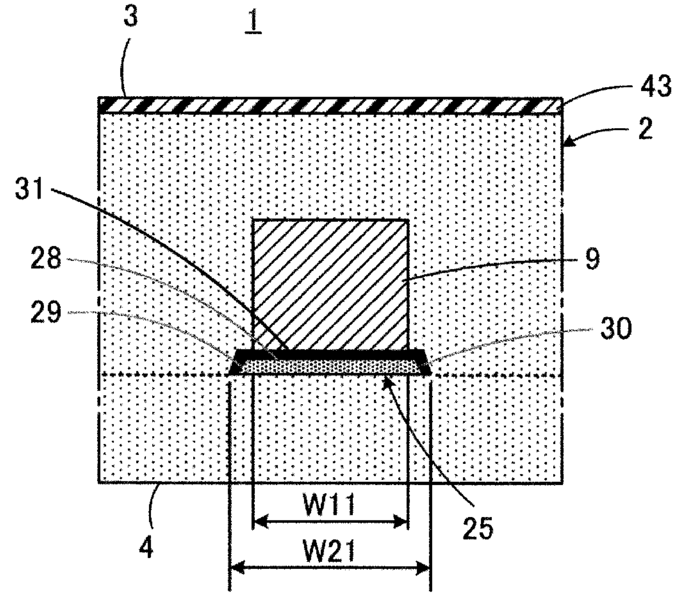
FIGS. 2A and 2B are an enlarged cross-sectional view illustrating a part of the coil component illustrated in FIG. 1.
Figure 2B:
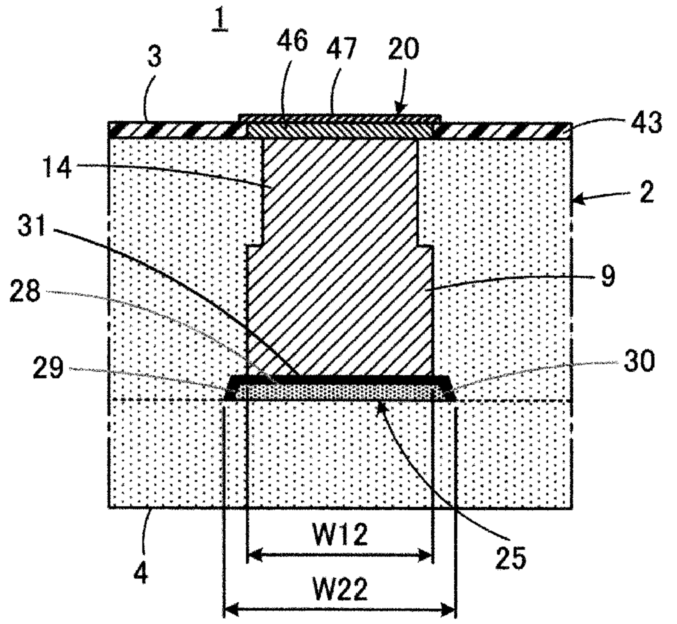

The pedestal 25 is best illustrated in FIGS. 2A and 2B. The pedestal 25 has a top surface 28 extending along the inductor wiring conductor 9 and a pair of side surfaces 29 and 30 each extending from both outer edges of the top surface 28 in a direction intersecting the top surface 28. Although detailed illustration is omitted, the pedestal 26 has a top surface extending along the inductor wiring conductor 10 and a pair of side surfaces each extending from both outer edges of the top surface in a direction intersecting the top surface, and the pedestal 27 has a top surface extending along the inductor wiring conductor 11 and a pair of side surfaces each extending from both outer edges of the top surface in a direction intersecting the top surface. Note that as illustrated in FIGS. 2A and 2B, the side surfaces 29 and 30 of the pedestal 25 may be inclined.

Note that when a gradient is expressed by an interior angle between the top surface 28 and the side surface 29 or an interior angle between the top surface 28 and the side surface 30, the gradient is preferably equal to or more than 120° and equal to or less than 160° (i.e., from 120° to 160°). Due to the gradient being equal to or more than 120°, the seed layer 31 can be more reliably made wider than the inductor wiring conductor 9. In addition, due to the gradient being equal to or less than 160°, the pedestal 25 does not expand excessively, the volume of the main body 2 that is a magnetic material can be ensured, and a decrease in the efficiency of obtaining an inductance value can be suppressed.

A conductive seed layer 31 is provided over the entire region of at least a region sandwiched between the top surface 28 of the pedestal 25 and the inductor wiring conductor 9. In this embodiment, the seed layer 31 is provided over the entire region of each of the top surface 28 and the side surfaces 29 and 30 of the pedestal 25. The seed layer 31 is preferably made of a material having the same main component as the inductor wiring conductors 9 to 11, and is made of, for example, Au, Pt, Pd, Ag, Cu, Al, Co, Cr, Zn, Ni, Ti, W, Fe, Sn, or In, or a compound thereof. Note that the seed layer 31 may have a component configuration different from that of the inductor wiring conductors 9 to 11 except for the main component depending on the difference in the formation method. In addition, the thickness of the seed layer 31 is not particularly limited as long as electric charge can be supplied and the seed layer 31 sufficiently functions in electrolytic plating, but is desirably equal to or less than 2 μm, for example.

In this embodiment, a width dimension W21 of the seed layer 31 is larger than a width dimension W11 of the surface of the inductor wiring conductor 9 in contact with the seed layer 31 illustrated in FIG. 2A. Similarly, a width dimension W22 of the seed layer 31 is larger than a width dimension W12 of the surface of the end portion of the inductor wiring conductor 9 in contact with the seed layer 31 illustrated in FIG. 2B. That is, the seed layer 31 is provided to extend to the outside of the inductor wiring conductor 9.

Note that the width dimensions W11 and W12 are defined as a "width dimension of the surface of the inductor wiring conductor 9 in contact with the seed layer 31" because width dimensions of the inductor wiring conductor 9 other than the surface in contact with the seed layer 31 are not particularly limited. For example, as in the case where the cross-sectional shape of the inductor wiring conductor 9 illustrated in FIGS. 2A and 2B is an inverted trapezoid, the width dimension of the inductor wiring conductor 9 other than the surface in contact with the seed layer 31 may be the same as or wider than the width dimension W21 or W22 of the seed layer 31. In addition, the width direction of the inductor wiring conductor 9 and the seed layer 31 refers to a direction parallel to the top surface 28 of the pedestal 25 in a cross section (transverse cross section) orthogonal to the direction in which the inductor wiring conductor 9 and the seed layer 31 extend.

The seed layer 31 is for supplying electric charge when the inductor wiring conductor 9 is formed by electrolytic plating, and is not required after the inductor wiring conductor 9 is formed. In addition, since the seed layer 31 is made of a conductive material, this may cause an undesirable electrical short circuit. Therefore, after the inductor wiring conductor 9 is formed, an unnecessary portion of the seed layer 31 is removed. Wet etching is typically applied to remove the unnecessary portion of the seed layer 31.

It should be understood that FIGS. 2A and 2B illustrate a state after the unnecessary portion of the seed layer 31 is removed. Therefore, before the unnecessary portion is removed, the seed layer 31 extends widely to the side of the inductor wiring conductor 9, for example, as illustrated in FIG. 5 to FIGS. 14A and 14B described later. As described above, when the width dimensions W21 and W22 are made wider than the width dimensions W11 and W12, respectively, the inductor wiring conductor 9 can be kept away from an unnecessary portion of the seed layer 31 to be removed. Therefore, even when the wet etching is applied to the removal of the unnecessary portion of the seed layer 31, for example, the inductor wiring conductor 9 can be less likely to be affected by the wet etching.

Although description has been given about the inductor wiring conductor 9, the pedestal 25, and the seed layer 31 illustrated in FIGS. 2A and 2B, the other inductor wiring conductors 10 and 11, the other pedestals 26 and 27, and seed layers provided thereon have substantially the same configuration.

Next, a preferred method of manufacturing the coil component 1 will be described with reference to FIG. 3 to FIG. 17. FIG. 3 to FIG. 17 illustrate a manufacturing method relating to a portion where the inductor wiring conductor 9 is provided. For also the portions where the other inductor wiring conductors 10 and 11 are provided, the same steps as those illustrated in FIG. 3 to FIG. 17 for the portion where the inductor wiring conductor 9 is provided are performed simultaneously.

Figure 3:
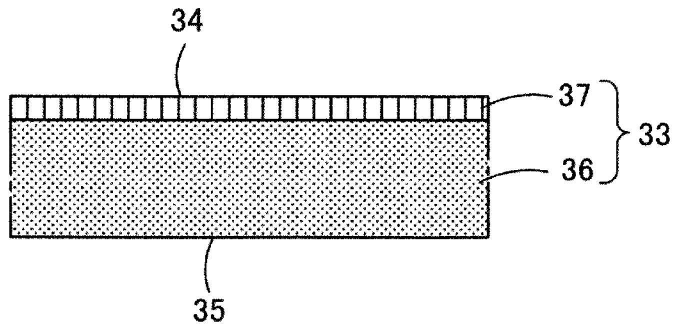
FIG. 3 is a cross-sectional view for explaining a method of manufacturing the coil component illustrated in FIG. 1, and illustrates a part of a support substrate to be prepared.

First, as illustrated in FIG. 3, a support substrate 33 is prepared. The support substrate 33 has a first main surface 34 and a second main surface 35 opposed to each other. The support substrate 33 includes a base portion 36 positioned on the second main surface 35 side and made of a material having relatively high flexural strength such as ferrite, and a coating portion 37 positioned on the first main surface 34 side and made of resin covering one main surface of the base portion 36, such as polyimide. The coating portion 37 is formed by, for example, applying resin onto the base portion 36 by spin coating and then curing the resin. Although not illustrated, an alignment mark is formed on the first main surface 34 provided by the coating portion 37 as necessary.

Figure 4:
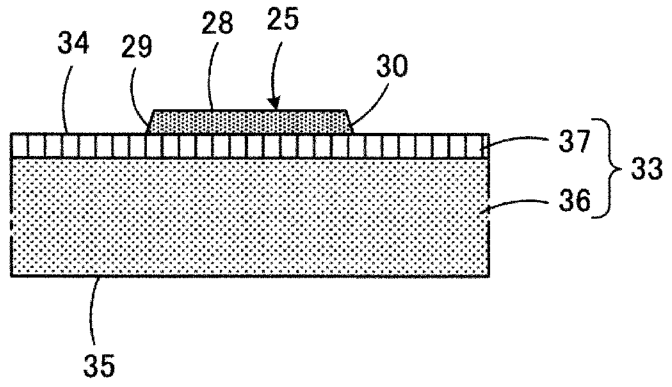
FIG. 4 is a cross-sectional view illustrating a step subsequent to the step illustrated in FIG. 3, and illustrates a state in which a pedestal is provided on a first main surface of the support substrate in a portion corresponding to the portion illustrated in FIG. 2A.

Next, as illustrated in FIG. 4, the pedestal 25 is formed on the first main surface 34 provided by the coating portion 37 of the support substrate 33. In order to form the pedestal 25, desired resin is spin-coated on the first main surface 34 of the support substrate 33, and patterned through respective steps of exposure, development, and curing. Although FIG. 4 illustrates a portion corresponding to the portion illustrated in FIG. 2A, the pedestal 25 extends to a portion corresponding to the portion illustrated in FIG. 2B. As described above, the pedestal 25 has the top surface 28 extending along the linear inductor wiring conductor 9 to be formed, and the pair of side surfaces 29 and 30 each extending from both outer edges of the top surface 28 in a direction intersecting the top surface 28.

Figure 5:
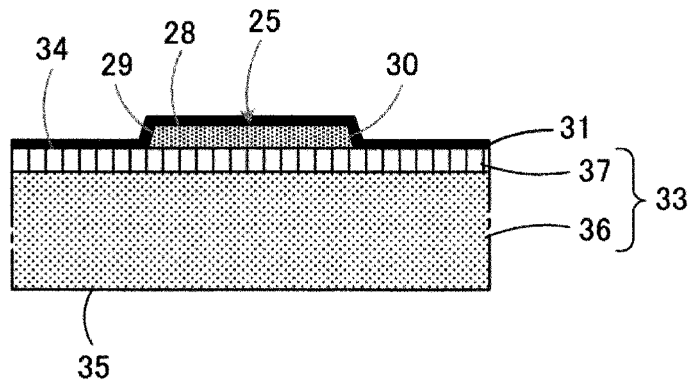
FIG. 5 is a cross-sectional view illustrating a step subsequent to the step illustrated in FIG. 4, and illustrates a state in which a conductive seed layer is formed so as to cover the pedestal and the first main surface of the support substrate exposed from the pedestal in a portion corresponding to the portion illustrated in FIG. 2A.

Next, as illustrated in FIG. 5, the conductive seed layer 31 is formed. The seed layer 31 is formed so as to cover the pedestal 25 and the first main surface 34 of the support substrate 33 exposed from the pedestal 25 by applying Cu electroless plating, sputtering, or the like, for example.

Figure 6:
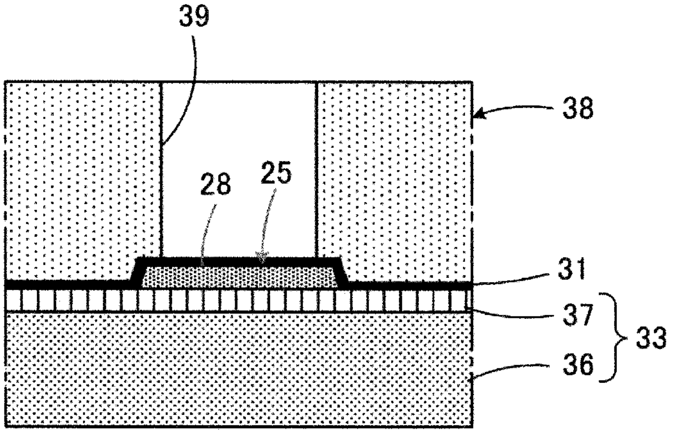
FIG. 6 is a cross-sectional view illustrating a step subsequent to the step illustrated in FIG. 5, and illustrates a state in which a first resist having an opening for exposing the seed layer on the central portion in a width direction of a top surface of the pedestal is provided on the seed layer in a portion corresponding to the portion illustrated in FIG. 2A.

Next, as illustrated in FIG. 6, a first resist 38 is provided on the seed layer 31. The first resist 38 has an opening 39 that exposes the seed layer 31 on the central portion in the width direction of the top surface 28 of the pedestal 25. The first resist 38 is formed of, for example, a dry film resist. More specifically, a dry film resist is laminated on the seed layer 31 while peeling off a protective film, and is patterned through the respective steps of exposure, development, and curing to form the first resist 38 having the opening 39.

Figure 7:
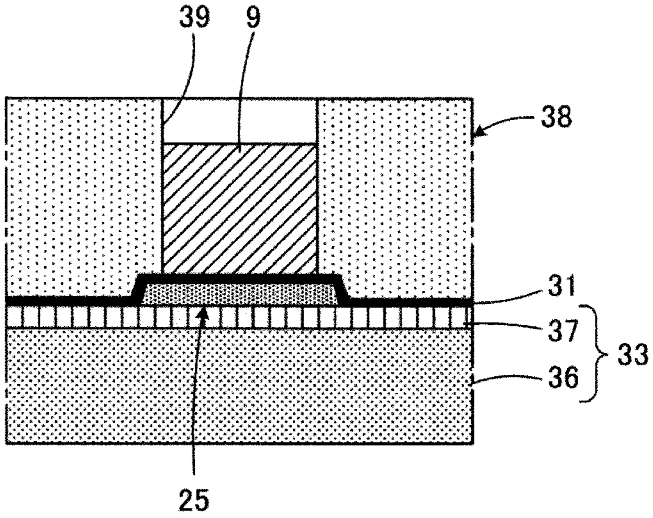
FIG. 7 is a cross-sectional view illustrating a step subsequent to the step illustrated in FIG. 6, and illustrates a state in which an inductor wiring conductor is formed on the seed layer through the opening of the first resist by electrolytic plating in a portion corresponding to the portion illustrated in FIG. 2A.

Next, as illustrated in FIG. 7, the inductor wiring conductor 9 is formed by electrolytic plating of a conductive metal such as Cu. The conductive metal to be the inductor wiring conductor 9 is plated and grown on the seed layer 31 to which the electric charge is supplied through the opening 39 of the first resist 38, and becomes the inductor wiring conductor 9.

Figure 8:
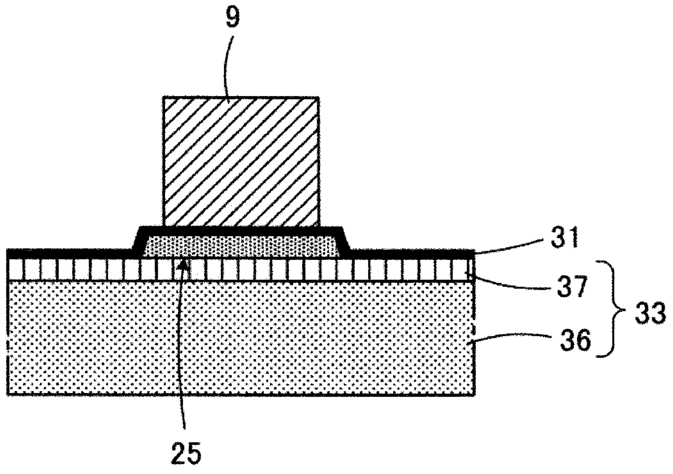
FIG. 8 is a cross-sectional view illustrating a step subsequent to the step illustrated in FIG. 7, and illustrates a state in which the first resist is removed in a portion corresponding to the portion illustrated in FIG. 2A.

Next, as illustrated in FIG. 8, the first resist 38 is peeled and removed.

Figure 9A:
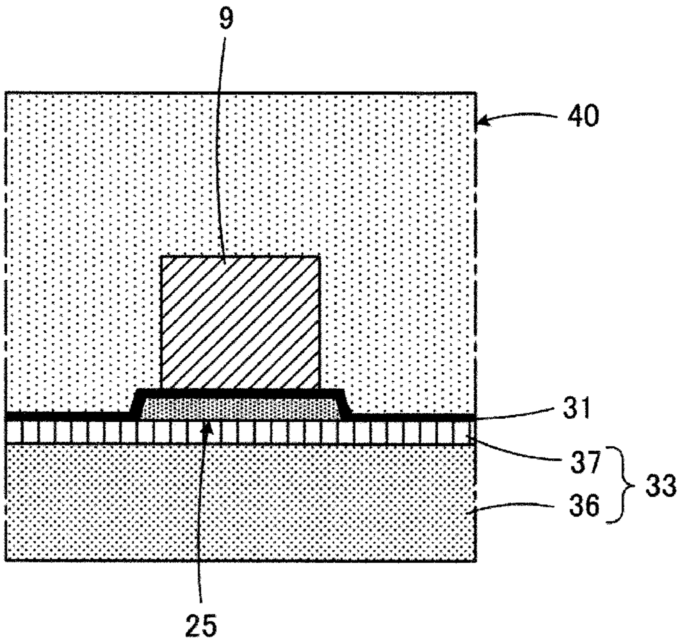
FIGS. 9A and 9B are a cross-sectional view illustrating a step subsequent to the step illustrated in FIG. 8.
Figure 9B:
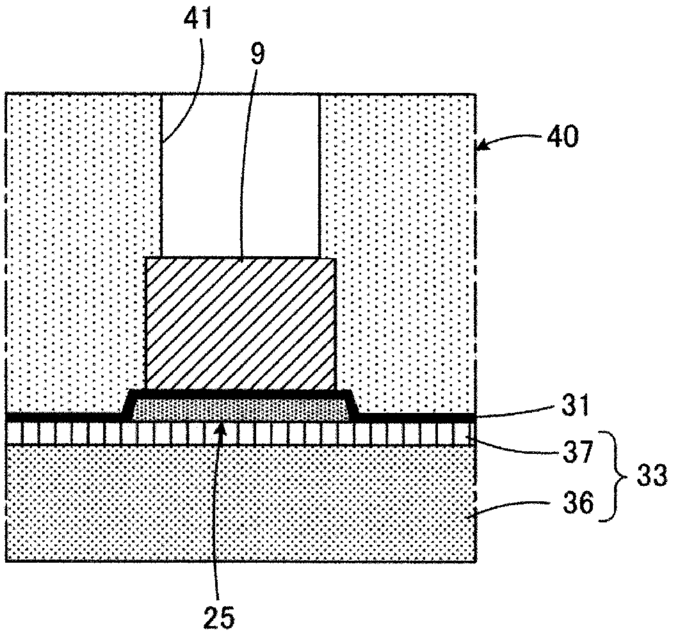

Next, as illustrated in FIGS. 9A and 9B, a second resist 40 is provided on the seed layer 31. The second resist 40 has an opening 41 of a pattern corresponding to the pattern of the extended conductor 14 electrically connected to the end portion of the inductor wiring conductor 9 in a portion corresponding to the portion illustrated in FIG. 2B illustrated in FIG. 9B. The second resist 40 is formed of, for example, a dry film resist. More specifically, as in the case of the first resist 38, a dry film resist is laminated on the seed layer 31 while the protective film is peeled off, and is patterned through the respective steps of exposure, development, and curing to form the second resist 40 having the opening 41. In a portion corresponding to the portion illustrated in FIG. 2A illustrated in FIG. 9A, the extended conductor 14 is not formed, and thus the opening 41 is not formed.

Figure 10A:
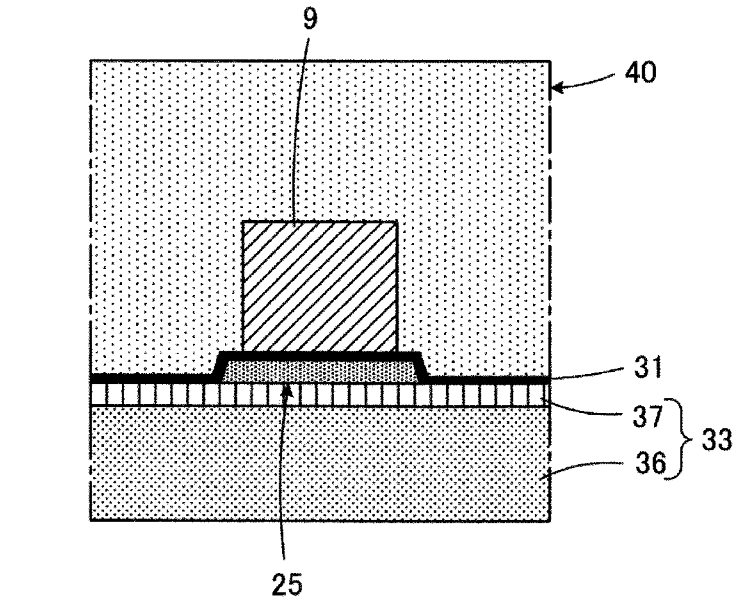
FIGS. 10A and 10B are a cross-sectional view illustrating a step subsequent to the step illustrated in FIGS. 9A and 9B.
Figure 10B:
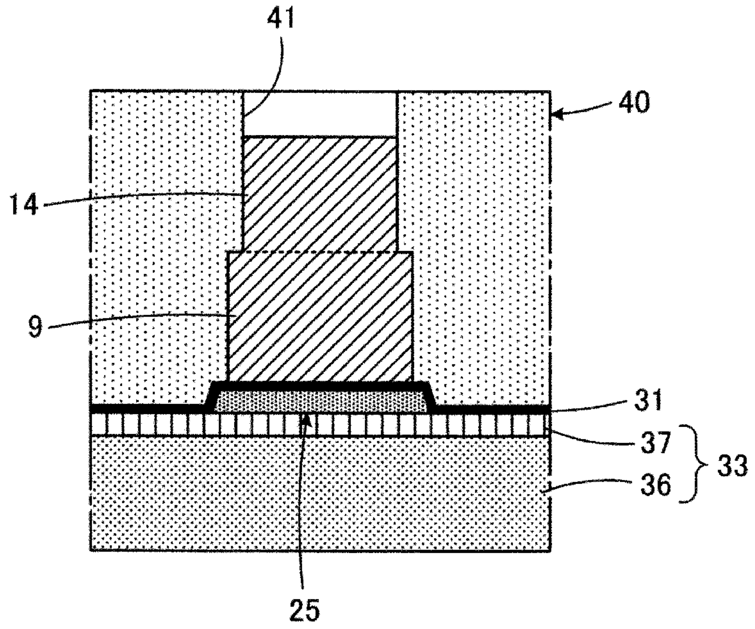

Next, as illustrated in FIGS. 10A and 10B, electrolytic plating of a conductive metal such as Cu is performed. At this time, in a portion corresponding to the portion illustrated in FIG. 2B illustrated in FIG. 10B, the extended conductor 14 is formed on the end portion of the inductor wiring conductor 9 through the opening 41 of the second resist 40 by electrolytic plating. The extended conductor 14 is preferably made of the same material as that of the inductor wiring conductor 9. In a portion corresponding to the portion illustrated in FIG. 2A illustrated in FIG. 10A, the state illustrated in FIG. 9A is maintained.

Figure 11A:
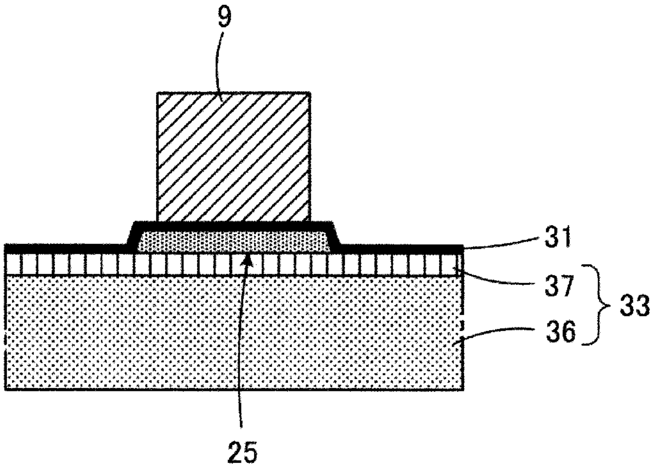
FIGS. 11A and 11B are a cross-sectional view illustrating a step subsequent to the step illustrated in FIGS. 10A and 10B.
Figure 11B:
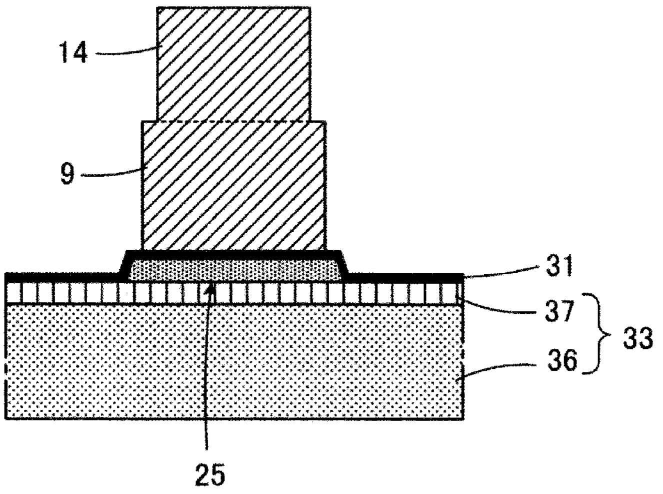

Next, as illustrated in FIGS. 11A and 11B, the second resist 40 is peeled and removed.

Figure 12A:
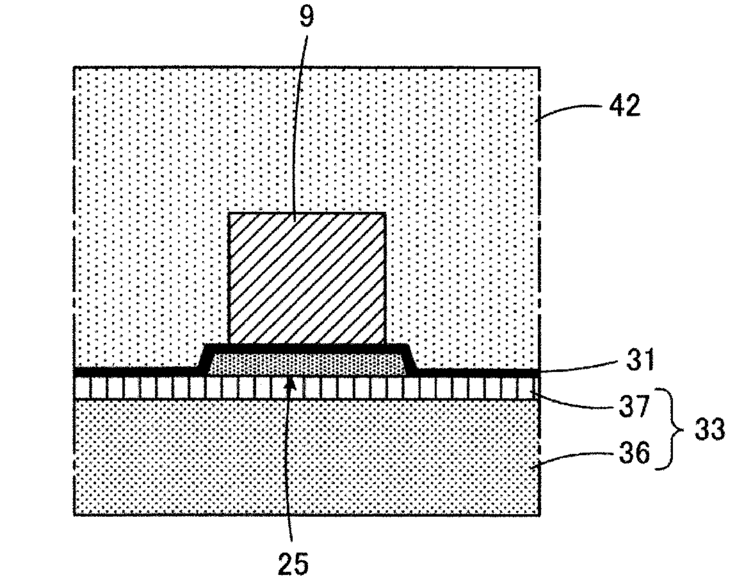
FIGS. 12A and 12B are a cross-sectional view illustrating a step subsequent to the step illustrated in FIGS. 11A and 11B.
Figure 12B:
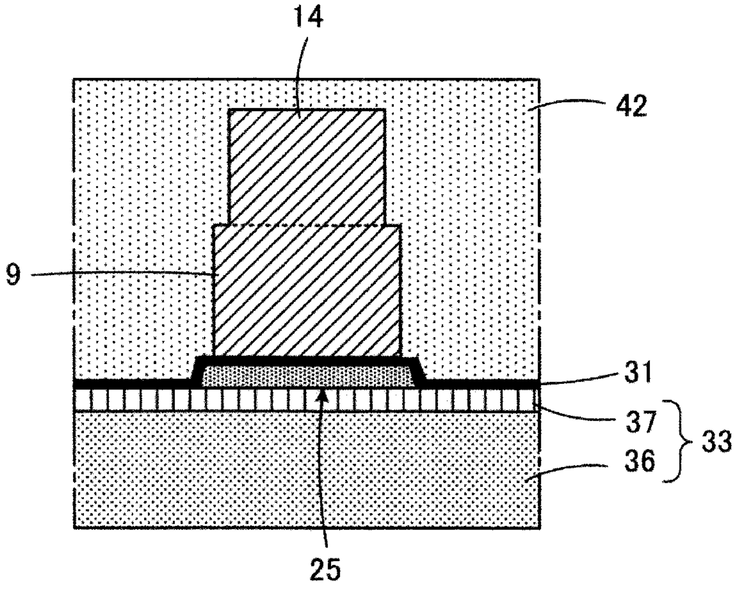

Next, as illustrated in FIGS. 12A and 12B, a first magnetic layer 42 is provided on the first main surface 34 side of the support substrate 33 so as to position the inductor wiring conductor 9 inside. At this time, in a portion corresponding to the portion illustrated in FIG. 2B illustrated in FIG. 12B, the first magnetic layer 42 incorporates not only the inductor wiring conductor 9 but also the extended conductor 14. In a portion corresponding to the portion illustrated in FIG. 2A illustrated in FIG. 12A, the first magnetic layer 42 incorporates only the inductor wiring conductor 9. The first magnetic layer 42 serves as a part of the main body 2 and is formed, for example, by pressing a sheet made of an organic material containing metal magnetic powder to obtain the state illustrated in FIGS. 12A and 12B and then performing curing.

Figure 13A:
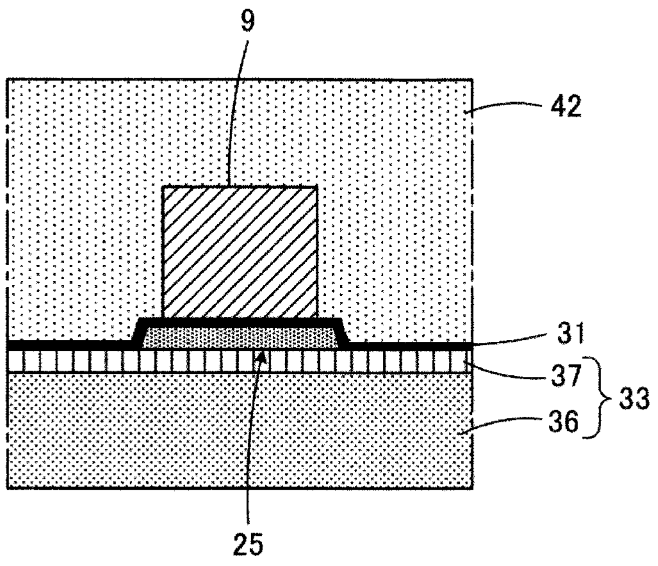
FIGS. 13A and 13B are a cross-sectional view illustrating a step subsequent to the step illustrated in FIGS. 12A and 12B.
Figure 13B:
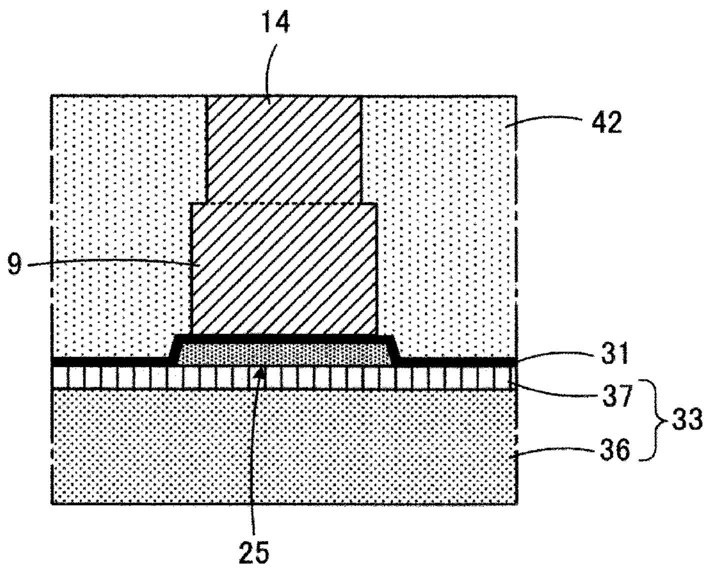

Next, as illustrated in FIGS. 13A and 13B, a step of scraping the first magnetic layer 42 from the surface facing outward is performed. This step is performed until at least the end surface of the extended conductor 14 is exposed in a portion corresponding to the portion illustrated in FIG. 2B illustrated in FIG. 13B, and preferably until the end surface of the extended conductor 14 is ground to be smooth. In a portion corresponding to the portion illustrated in FIG. 2A illustrated in FIG. 13A, the thickness of the first magnetic layer 42 is reduced while maintaining the state in which the inductor wiring conductor 9 is incorporated.

Figure 14A:
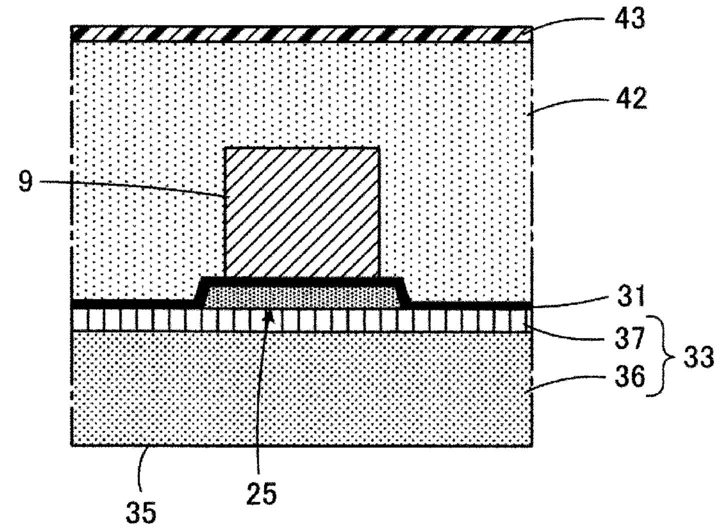
FIGS. 14A and 14B are a cross-sectional view illustrating a step subsequent to the step illustrated in FIGS. 13A and 13B.
Figure 14B:
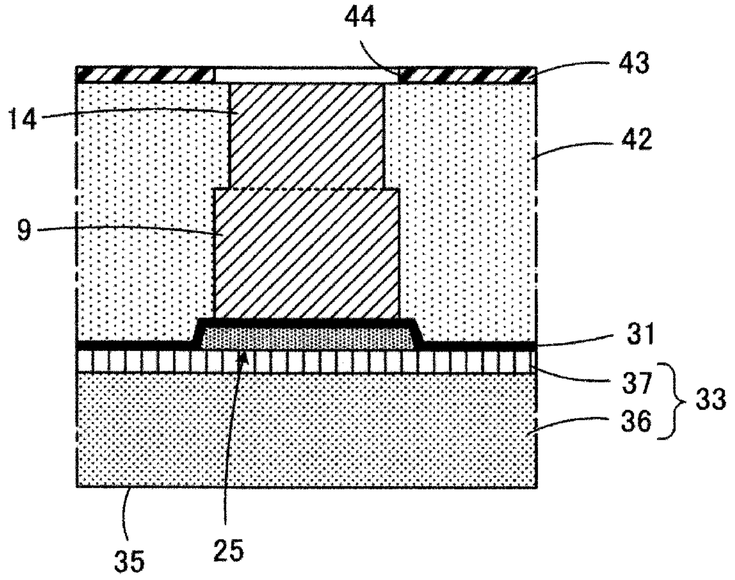

Next, as illustrated in FIGS. 14A and 14B, the solder resist 43 is provided on the surface of the first magnetic layer 42 through respective steps of printing, exposure, development, and curing. In a portion corresponding to the portion illustrated in FIG. 2B illustrated in FIG. 14B, an opening 44 for exposing the end surface of the extended conductor 14 is provided in the solder resist 43. In a portion corresponding to the portion illustrated in FIG. 2A illustrated in FIG. 14A, no opening is provided in the solder resist 43.

Figure 15A:
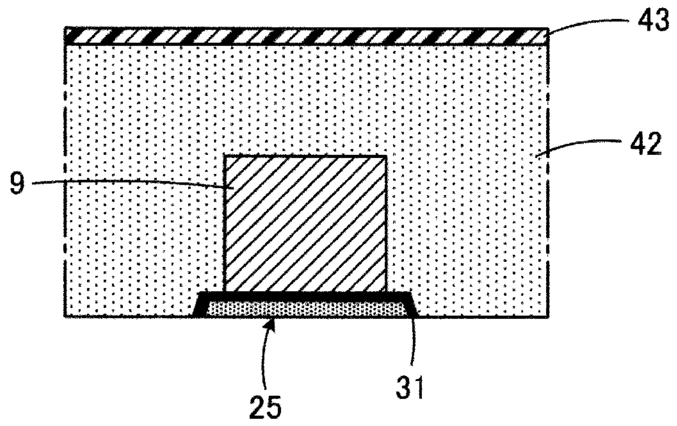
FIGS. 15A and 15B are a cross-sectional view illustrating a step subsequent to the step illustrated in FIGS. 14A and 14B.
Figure 15B:
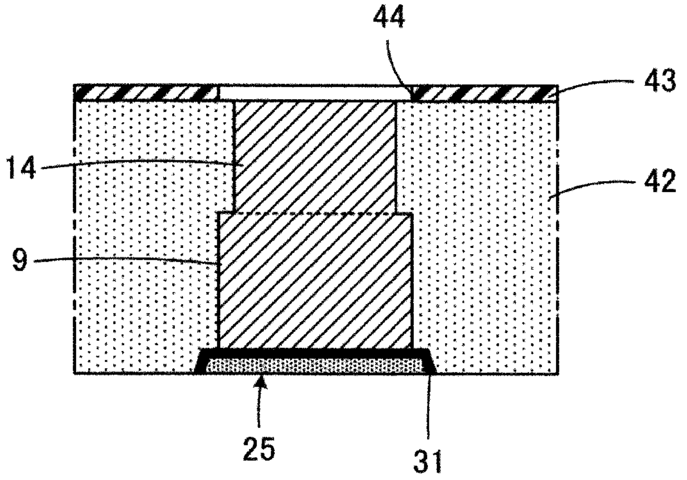

Next, as illustrated in FIGS. 15A and 15B, in order to expose the pedestal 25 on the second main surface 35 side of the support substrate 33, the support substrate 33 and portions of the seed layer 31 other than the portion covering the pedestal 25 are removed from the second main surface 35 side of the support substrate 33 (see FIGS. 14A and 14B). In this way, unnecessary portions of the seed layer 31 can be removed without performing a wet etching step.

Figure 16A:
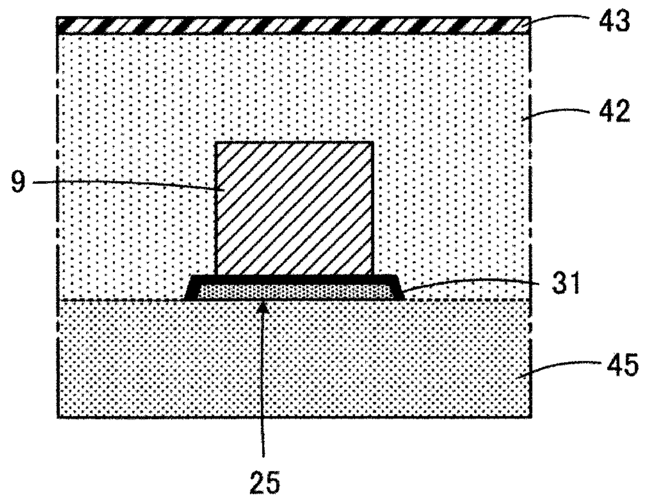
FIGS. 16A and 16B are a cross-sectional view illustrating a step subsequent to the step illustrated in FIGS. 15A and 15B.
Figure 16B:
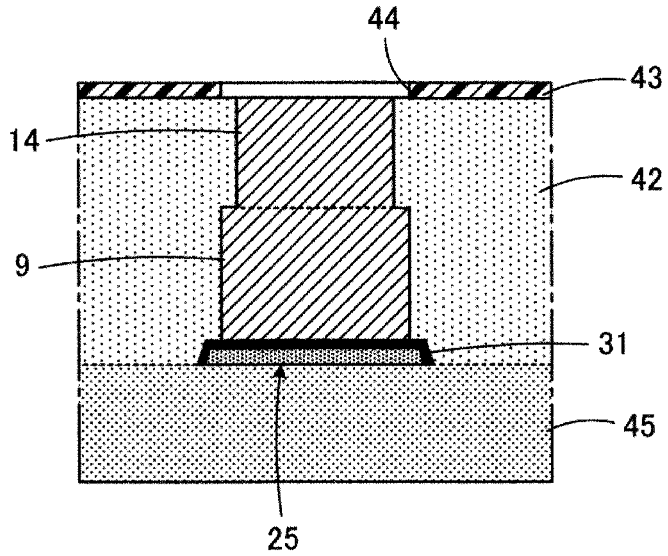

Next, as illustrated in FIGS. 16A and 16B, a second magnetic layer 45 is provided so as to be in contact with the pedestal 25 and the first magnetic layer 42. The second magnetic layer 45 is formed, for example, by pressing a sheet made of an organic material containing metal magnetic powder to obtain the state illustrated in FIGS. 16A and 16B and then performing curing. The second magnetic layer 45 and the above-described first magnetic layer 42 configure the main body 2.

Note that the step of providing the solder resist 43 on the surface of the first magnetic layer 42 illustrated in FIGS. 14A and 14B may be performed after the step of removing the support substrate 33 illustrated in FIGS. 15A and 15B or after the step of providing the second magnetic layer 45 illustrated in FIGS. 16A and 16B.

Figure 17:
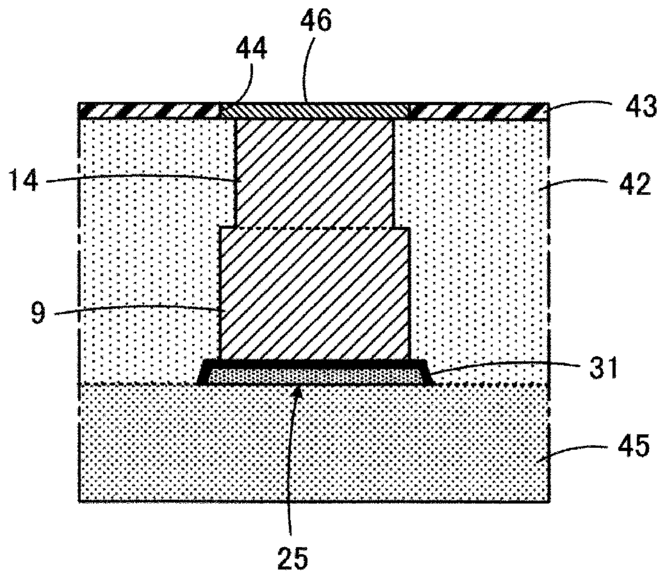
FIG. 17 is a cross-sectional view illustrating a step subsequent to the step illustrated in FIGS. 15A and 15B, and illustrates a state in which a base layer of an external terminal electrode electrically connected to the extended conductor is formed in a portion corresponding to the portion illustrated in FIG. 2B.

Next, as illustrated in FIG. 17, a base layer 46 of the external terminal electrode 20 electrically connected to the extended conductor 14 is formed in the opening 44 of the solder resist 43 in a portion corresponding to the portion illustrated in FIG. 2B. The base layer 46 is provided by, for example, a Cu electroless plating layer, and further, as illustrated in FIG. 2B, a surface layer 47 composed of, for example, an Ni plating layer and an Au plating layer by electrolytic plating is formed on the base layer 46.

The coil component 1 is manufactured in this manner, however, in a case where a plurality of the coil components 1 is simultaneously manufactured by the above-described steps, that is, being manufactured in a mother state, a step of cutting an assembly of the coil components 1 in the mother state by, for example, a dicer is performed thereafter.

Second Embodiment

A second embodiment of the present disclosure will be described with reference to FIGS. 18A and 18B to FIGS. 20A and 20B. In FIGS. 18A and 18B to FIGS. 20A and 20B, elements corresponding to those illustrated in FIGS. 2A and 2B to FIG. 17 are denoted by the same reference numerals, and redundant description will be omitted.

Figure 18A:
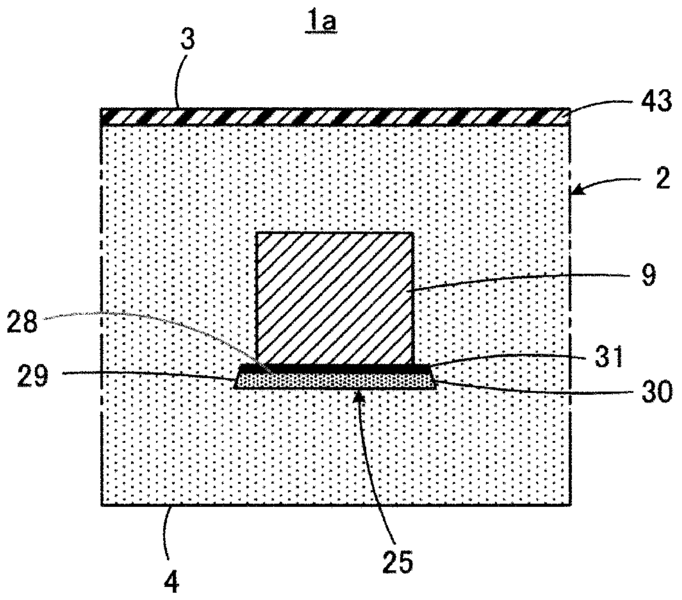
FIGS. 18A and 18B are an enlarged cross-sectional view illustrating a part of the coil component.
Figure 18B:
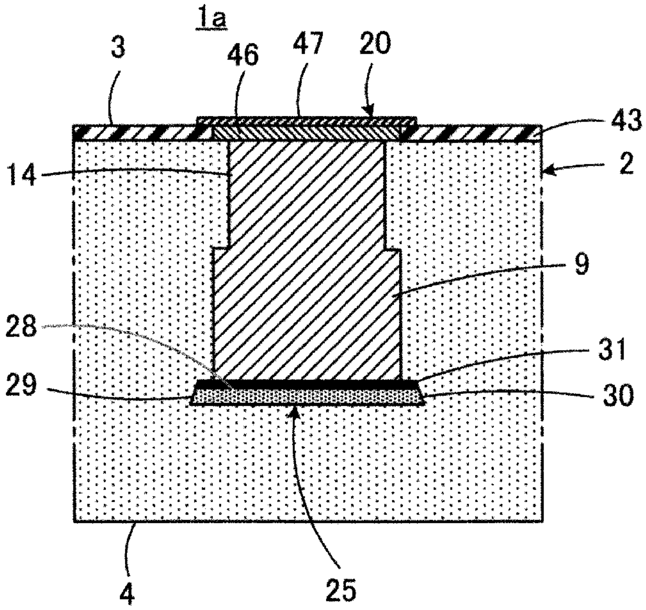

FIGS. 18A and 18B are diagrams corresponding to FIGS. 2A and 2B. In the coil component 1 according to the first embodiment described above, the seed layer 31 is provided on the entire region of each of the top surface 28 and the side surfaces 29 and 30 of the pedestal 25, however, in a coil component 1*a* according to the second embodiment, the seed layer 31 is provided only on the top surface 28 of the pedestal 25.

In order to manufacture the coil component 1*a* according to the second embodiment, first, the steps up to the step illustrated in FIGS. 11A and 11B in the manufacturing method according to the first embodiment are performed in the same manner.

Figure 19A:
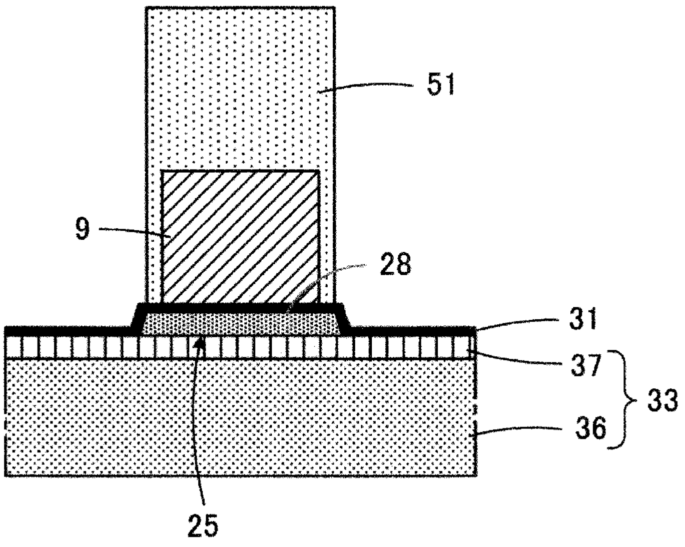
FIGS. 19A and 19B are a cross-sectional view for explaining a method of manufacturing a coil component 1*a* illustrated in FIGS. 18A and 18B.
Figure 19B:
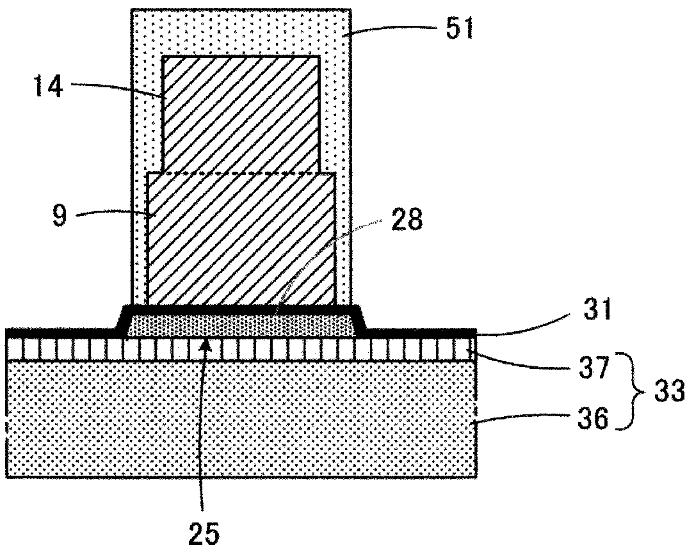

Following the step illustrated in FIGS. 11A and 11B, a resist 51 is provided on the seed layer 31, as illustrated in FIGS. 19A and 19B. The resist 51 is formed of, for example, a dry film resist. More specifically, a dry film resist is laminated on the seed layer 31 while the protective film is peeled off, and is patterned through the respective steps of exposure, development, and curing. As such, the resist 51 is formed in a manner so as to cover the inductor wiring conductor 9 and a portion of the seed layer 31 positioned on the top surface 28 of the pedestal 25 in a portion corresponding to the portion illustrated in FIG. 2A illustrated in FIG. 19A, and cover the inductor wiring conductor 9 and the extended conductor 14 and cover a portion of the seed layer 31 positioned on the top surface 28 of the pedestal 25 in a portion corresponding to the portion illustrated in FIG. 2B illustrated in FIG. 19B.

Figure 20A:
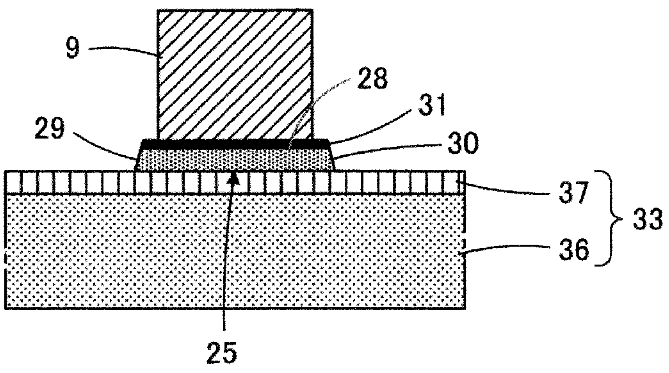
FIGS. 20A and 20B are a cross-sectional view illustrating a step subsequent to the step illustrated in FIGS. 19A and 19B.
Figure 20B:
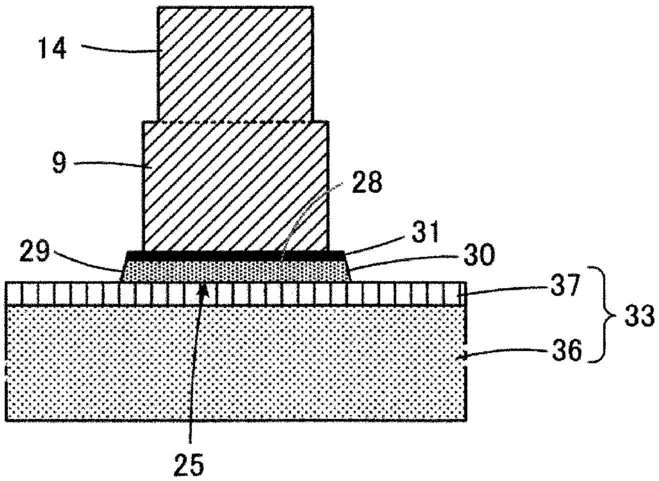

Next, in the state illustrated in FIGS. 19A and 19B, a wet etching step is performed on the seed layer 31. As a result, the seed layer 31 is removed in the portion exposed from the resist 51. In this way, FIGS. 20A and 20B illustrates a state in which the resist 51 has been removed after the unnecessary portion of the seed layer 31 has been removed.

Thereafter, substantially the same steps as the steps of providing the first magnetic layer 42 illustrated in FIGS. 12A and 12B described above, scraping the first magnetic layer 42 to expose the end surface of the extended conductor 14 illustrated in FIGS. 13A and 13B, providing the solder resist 43 on the first magnetic layer 42 illustrated in FIGS. 14A and 14B, removing the support substrate 33 illustrated in FIGS. 15A and 15B, providing the second magnetic layer 45 so as to be in contact with the pedestal 25 and the first magnetic layer 42 illustrated in FIGS. 16A and 16B, and forming the base layer 46 of the external terminal electrode 20 illustrated in FIG. 17 are performed, and further, the surface layer 47 of the external terminal electrode 20 is formed, thereby obtaining the coil component 1*a* illustrated in FIGS. 18A and 18B.

According to the second embodiment, when the unnecessary portion of the seed layer 31 is removed, the inductor wiring conductor 9 is protected during wet etching so that the inductor wiring conductor 9 is not thinned, as compared with the case where wet etching is applied while the state illustrated in FIGS. 11A and 11B remains without taking any measures, for example. In addition, as compared with the case where the wet etching is applied in the state illustrated in FIGS. 11A and 11B to remove an unnecessary portion of the seed layer 31, an area where the seed layer 31 is in contact with the pedestal 25 is increased, and a close contact force of the seed layer 31 to the pedestal 25 can be improved.

Third to Fifth Embodiments

Third to fifth embodiments will be described with reference to the pedestal 25 illustrated in FIG. 21 to FIG. 23. Although the description is omitted, the same applies to the other pedestals 26 and 27.

In the first embodiment, wet etching is not applied at all, but in the third to fifth embodiments, wet etching is performed for a short time in the state illustrated in FIGS. 11A and 11B. Therefore, the seed layer 31 is incompletely etched in a portion exposed from the inductor wiring conductor 9.

Figure 21:
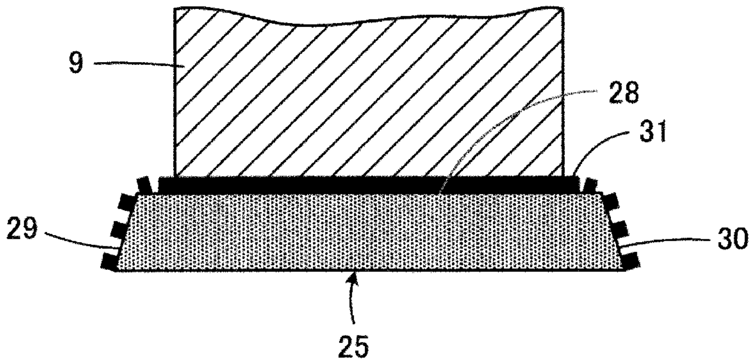
FIG. 21 is an enlarged cross-sectional view illustrating a formation state of the seed layer included in the coil component.

More specifically, in the third embodiment illustrated in FIG. 21, the seed layer 31 is incompletely etched on a part of the top surface 28 and a part of each of the side surfaces 29 and 30 of the pedestal 25.

Figure 22:
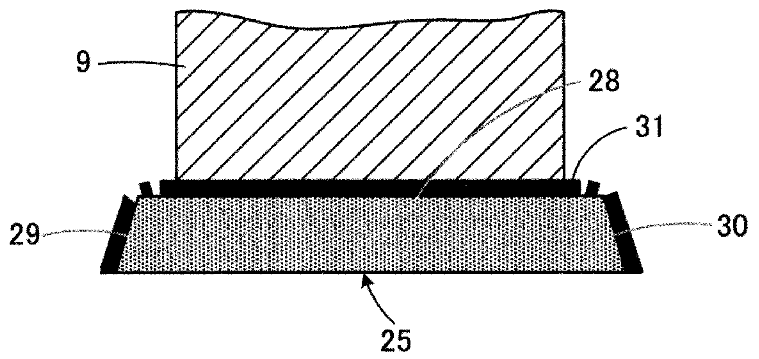
FIG. 22 is an enlarged cross-sectional view illustrating a formation state of the seed layer included in the coil component.

In the fourth embodiment illustrated in FIG. 22, the seed layer 31 is incompletely etched on a part of the top surface 28 of the pedestal 25.

Figure 23:
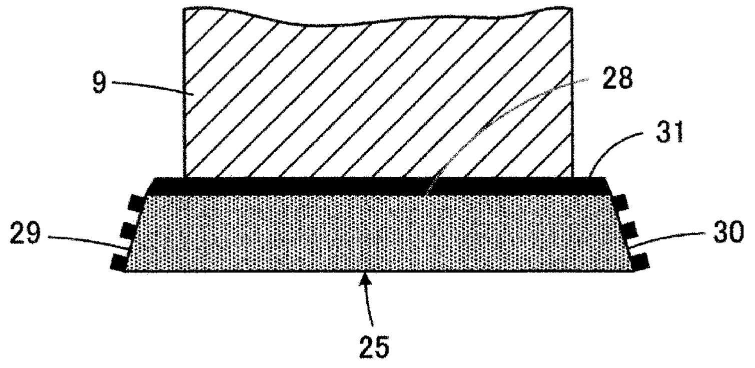
FIG. 23 is an enlarged cross-sectional view illustrating a formation state of the seed layer included in the coil component.

In the fifth embodiment illustrated in FIG. 23, the seed layer 31 is incompletely etched on a part of each of the side surfaces 29 and 30 of the pedestal 25.

The incomplete etching applied in the third to fifth embodiments described above results in the formation of a discontinuous portion in the seed layer 31 on a part of at least one of the top surface 28 and the side surfaces 29 and 30 of the pedestal 25.

According to the third to fifth embodiments, as compared with the second embodiment, the contact area between the seed layer 31 and the pedestal 25 is increased, or the distribution region of the contact portion between the seed layer 31 and the pedestal 25 is widened, so that the close contact force of the seed layer 31 to the pedestal 25 can be improved. In addition, according to the third to fifth embodiments, although not illustrated in FIG. 21 to FIG. 23, since a rough surface is formed at the boundary between the pedestal 25 and the first magnetic layer 42, the effect of improving the close contact force between the first magnetic layer 42 and the pedestal 25 can be expected.

Sixth Embodiment

Figure 24:
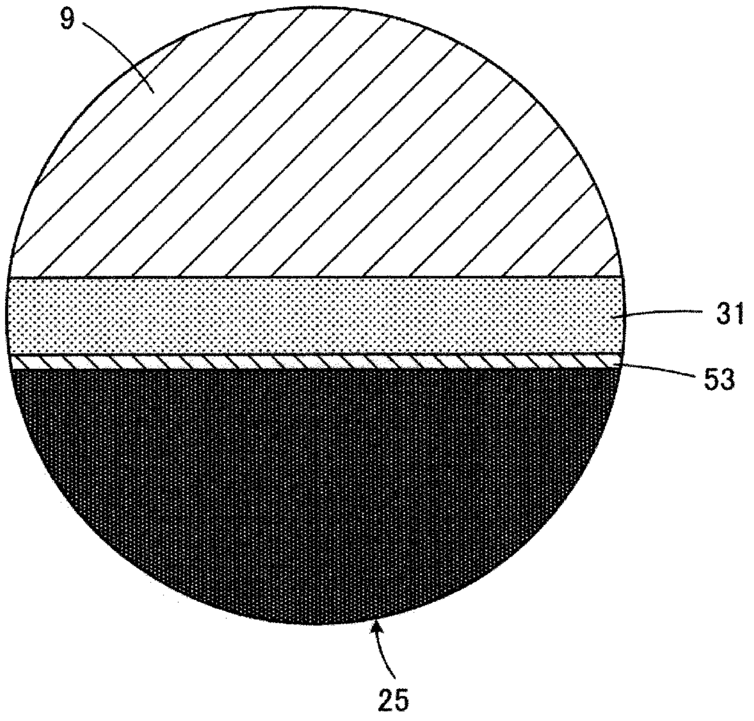
FIG. 24 is an enlarged cross-sectional view illustrating a part of a close contact layer formed between the pedestal and the seed layer in the coil component.

Referring to FIG. 24, a sixth embodiment will be described in relation to the pedestal 25. Although the description is omitted, the same applies to the other pedestals 26 and 27.

The sixth embodiment is characterized in that a close contact layer 53 for improving a close contact property between the seed layer 31 and the pedestal 25 is further provided between the seed layer 31 and the pedestal 25. As the material of the close contact layer 53, a material suitable for the purpose of improving the close contact force can be appropriately selected as long as it does not affect the formation of the inductor wiring conductor 9. As an example, in a case where Ti is not used as the material of the seed layer 31, the close contact layer 53 is preferably formed by a Ti layer.

The sixth embodiment can be applied in combination with any one of the first to fifth embodiments described above.

Although the present disclosure has been described with reference to several embodiments illustrated in the drawings, various other modifications are possible within the scope of the present disclosure.

For example, the form, number, and the like of the inductor wiring conductors in the coil component can be arbitrarily changed according to the design. The inductor wiring conductor may extend in a spiral shape, for example.

In addition, regarding the structure of the coil component according to the present disclosure, a method of forming the inductor wiring conductor is not limited, and an electroless plating method, a sputtering method, a vapor deposition method, a printing method, or the like may be applied in addition to the electrolytic plating method described above.

In addition, each embodiment described in this specification is an example, and it is possible to partially replace or combine configurations between different embodiments.

What is claimed is:

1. A coil component comprising:

a main body including a magnetic material;

a linear inductor wiring conductor arranged in the main body;

an electrically insulating pedestal having a top surface extending along the inductor wiring conductor in the main body and a pair of side surfaces each extending from both outer edges of the top surface in a direction intersecting the top surface, and at least one of the side surfaces is inclined with respect to the top surface; and a conductive seed layer over an entire region of at least a region sandwiched between the top surface of the pedestal and the inductor wiring conductor, wherein when a width dimension in a width direction of a surface of the inductor wiring conductor in contact with the seed layer is defined as a first width dimension and a width dimension in the width direction of the seed layer is defined as a second width dimension, the second width dimension is larger than the first width dimension.

2. The coil component according to claim 1, further comprising:

an external terminal electrode exposed on an outer surface of the main body; and an extended conductor that is positioned so as to overlap an end portion of the inductor wiring conductor and electrically connects the end portion of the inductor wiring conductor to the external terminal electrode.

3. The coil component according to claim 2, wherein the seed layer is on the top surface and the side surface of the pedestal.

4. The coil component according to claim 2, wherein the seed layer is on the top surface of the pedestal, but is absent from the side surface of the pedestal.

5. The coil component according to claim 2, further comprising:

a close contact layer configured to improve a close contact property between the seed layer and the pedestal.

6. The coil component according to claim 2, wherein the inductor wiring conductor and the seed layer include materials having the same main component.

7. The coil component according to claim 2, wherein the pedestal includes resin.

8. The coil component according to claim 1, wherein the seed layer is on the top surface of the pedestal, but is absent from the side surface of the pedestal.

9. The coil component according to claim 1, wherein the inductor wiring conductor and the seed layer include materials having the same main component.

10. The coil component according to claim 1, wherein the pedestal includes resin.

11. The coil component according to claim 1, wherein the side surfaces meet the top surface at opposite edges of the top surface, and a distance between the opposite edges is greater than the first width dimension.

12. A coil component comprising:

a main body including a magnetic material;

a linear inductor wiring conductor arranged in the main body;

an electrically insulating pedestal having a top surface extending along the inductor wiring conductor in the main body and a pair of side surfaces each extending from both outer edges of the top surface in a direction intersecting the top surface; and a conductive seed layer over an entire region of at least a region sandwiched between the top surface of the pedestal and the inductor wiring conductor, wherein when a width dimension in a width direction of a surface of the inductor wiring conductor in contact with the seed layer is defined as a first width dimension and a width dimension in the width direction of the seed layer is defined as a second width dimension, the second width dimension is larger than the first width dimension, and the seed layer is on the top surface and the side surface of the pedestal.

13. The coil component according to claim 12, wherein the seed layer is over an entire region of each of the top surface and the side surface of the pedestal.

14. The coil component according to claim 13, further comprising:

a close contact layer configured to improve a close contact property between the seed layer and the pedestal.

15. The coil component according to claim 12, wherein the seed layer has a discontinuous portion on a part of at least one of the top surface and the side surface of the pedestal.

16. The coil component according to claim 12, further comprising:

a close contact layer configured to improve a close contact property between the seed layer and the pedestal.

17. The coil component according to claim 12, wherein the inductor wiring conductor and the seed layer include materials having the same main component.

18. The coil component according to claim 12, wherein the pedestal includes resin.

19. A coil component comprising:

a main body including a magnetic material;

a linear inductor wiring conductor arranged in the main body;

an electrically insulating pedestal having a top surface extending along the inductor wiring conductor in the main body and a pair of side surfaces each extending from both outer edges of the top surface in a direction intersecting the top surface;

a conductive seed layer over an entire region of at least a region sandwiched between the top surface of the pedestal and the inductor wiring conductor; and a close contact layer configured to improve a close contact property between the seed layer and the pedestal, wherein when a width dimension in a width direction of a surface of the inductor wiring conductor in contact with the seed layer is defined as a first width dimension and a width dimension in the width direction of the seed layer is defined as a second width dimension, the second width dimension is larger than the first width dimension.

* * * * *